(12) United States Patent (10) Patent No.: US 8,360,379 B2
Porcelli (45) Date of Patent: Jan. 29, 2013

(54) CAR AND TRUCK BEVERAGE HOLDER

(76) Inventor: Joseph E. Porcelli, Merrick, NY (US)

( * ) Notice: Subject to any disclaimer, the term of this patent is extended or adjusted under 35 U.S.C. 154(b) by 507 days.

(21) Appl. No.: 09/356,771

(22) Filed: Jul. 16, 1999

(65) Prior Publication Data

US 2002/0063192 A1 May 30, 2002

(51) Int. Cl.
*A47K 1/08* (2006.01)
(52) U.S. Cl. ................ 248/311.2; 248/313; 224/926
(58) Field of Classification Search ............ 248/311.2, 248/313, 214, 909; 224/926, 42.45 R; 107/619, 107/623
See application file for complete search history.

(56) References Cited

U.S. PATENT DOCUMENTS

| | | | | |
|---|---|---|---|---|
| D228,335 S | * | 9/1973 | Jackson | D7/620 |
| 3,918,920 A | | 11/1975 | Barber | |
| 4,508,303 A | | 4/1985 | Beckerer, Jr. | |
| 4,530,480 A | * | 7/1985 | Pratt | 248/311.2 |
| 4,643,381 A | | 2/1987 | Levy | |
| 4,727,890 A | * | 3/1988 | Vincent | 131/329 |
| 4,818,017 A | | 4/1989 | Dykstra et al. | |
| 4,819,843 A | * | 4/1989 | Nakayama | 224/42.45 R |
| 4,919,381 A | * | 4/1990 | Buist | 248/154 |
| 4,928,865 A | * | 5/1990 | Lorence et al. | 224/275 |
| 4,928,873 A | | 5/1990 | Johnson | |
| 5,060,899 A | | 10/1991 | Lorence et al. | |
| 5,154,380 A | | 10/1992 | Risca | |
| D340,622 S | * | 10/1993 | Park et al. | D7/620 |
| 5,297,767 A | * | 3/1994 | Miller et al. | 248/311.2 |
| 355,336 A | | 2/1995 | Dickey et al. | |
| D355,336 S | * | 2/1995 | Dickey et al. | D7/620 |
| 5,445,350 A | * | 8/1995 | Rigsby | 248/313 |
| 5,509,633 A | * | 4/1996 | Ruster et al. | 248/311.2 |
| 5,573,164 A | | 11/1996 | Law | |
| 5,628,441 A | * | 5/1997 | Dykstra | 224/483 |
| 5,673,891 A | * | 10/1997 | Fujihara et al. | 248/311.2 |
| 5,704,579 A | | 1/1998 | Celentino et al. | |
| 5,791,617 A | * | 8/1998 | Boman et al. | 248/311.2 |
| 5,839,711 A | * | 11/1998 | Bieck et al. | 248/313 |
| 5,860,559 A | * | 1/1999 | Wang | 220/737 |

(Continued)

FOREIGN PATENT DOCUMENTS

DE 197 29 689 A1 * 1/1999
JP 411180204 A * 7/1999

*Primary Examiner* — Bradley Duckworth
(74) *Attorney, Agent, or Firm* — Galgano & Associates, PLLC; Thomas M. Galgano; Jessica G. Bower

(57) ABSTRACT

A beverage container holder for holding round or rectangular containers is disclosed. According to one embodiment, the holder is a unitary plastic structure which includes a lower rectangular container holding portion and an upper hook portion for hanging the holder onto another structure. The holding portion includes a plurality of resilient inwardly extending fingers, each of which assumes a generally V-shaped configuration when viewed in a vertical plane. According to a second embodiment, the holder includes an upper tray portion having a pair of side-by-side square openings, each having a plurality of inward extending resilient fingers, and a generally U-shaped supporting member which is pivotally attached to the tray portion. The supporting member is rotatable from a first position wherein it is retained within the tray portion to a second position wherein it is substantially perpendicular to the tray portion. When the supporting member is in the first position, the holder may re retracted into a rectangular pocket. When the holder is withdrawn from the pocket, the supporting member may be rotated to the second position so that beverage containers placed into the square openings of the tray portion are supported from beneath. The supporting member is preferably spring loaded so that it automatically rotates to the second position when the holder is withdrawn from the pocket.

2 Claims, 2 Drawing Sheets

U.S. PATENT DOCUMENTS

| | | | |
|---|---|---|---|
| 5,860,630 A * | 1/1999 | Wildey et al. | 248/311.2 |
| 5,897,090 A * | 4/1999 | Smith et al. | 248/311.2 |
| 5,938,160 A * | 8/1999 | Hartmann et al. | 248/311.2 |
| 6,253,975 B1 * | 7/2001 | Ichioka et al. | 224/281 |
| 6,290,063 B1 * | 9/2001 | Vogt et al. | 206/549 |
| 6,299,116 B1 * | 10/2001 | Levesque | 248/231.41 |
| 6,302,364 B1 * | 10/2001 | Chiueh | 206/545 |
| 2003/0106976 A1 * | 6/2003 | Then et al. | 248/311.2 |
| 2004/0021048 A1 * | 2/2004 | Schaal | 248/310 |

* cited by examiner

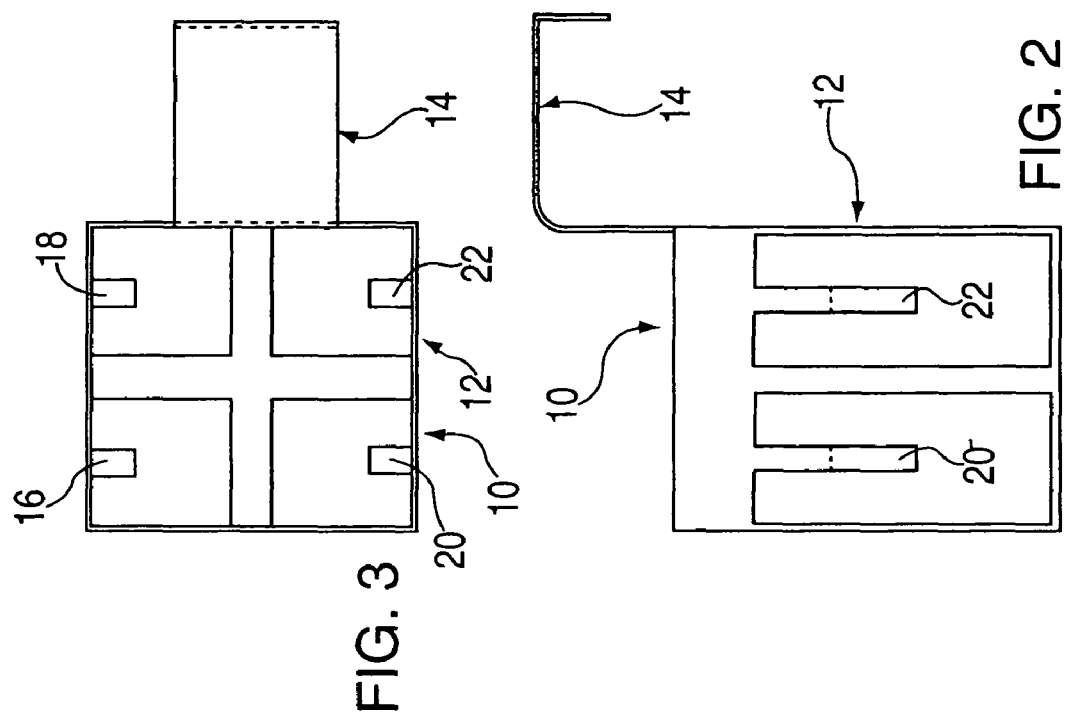

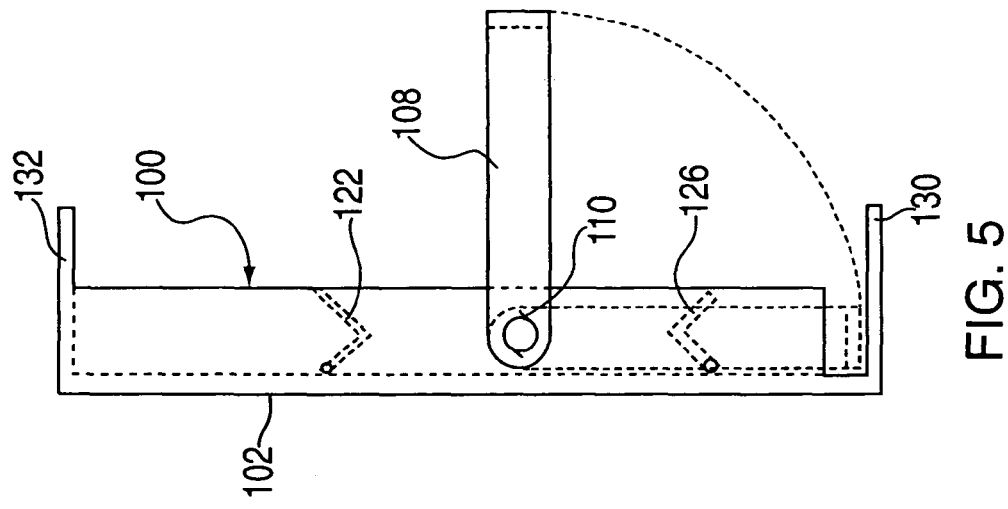
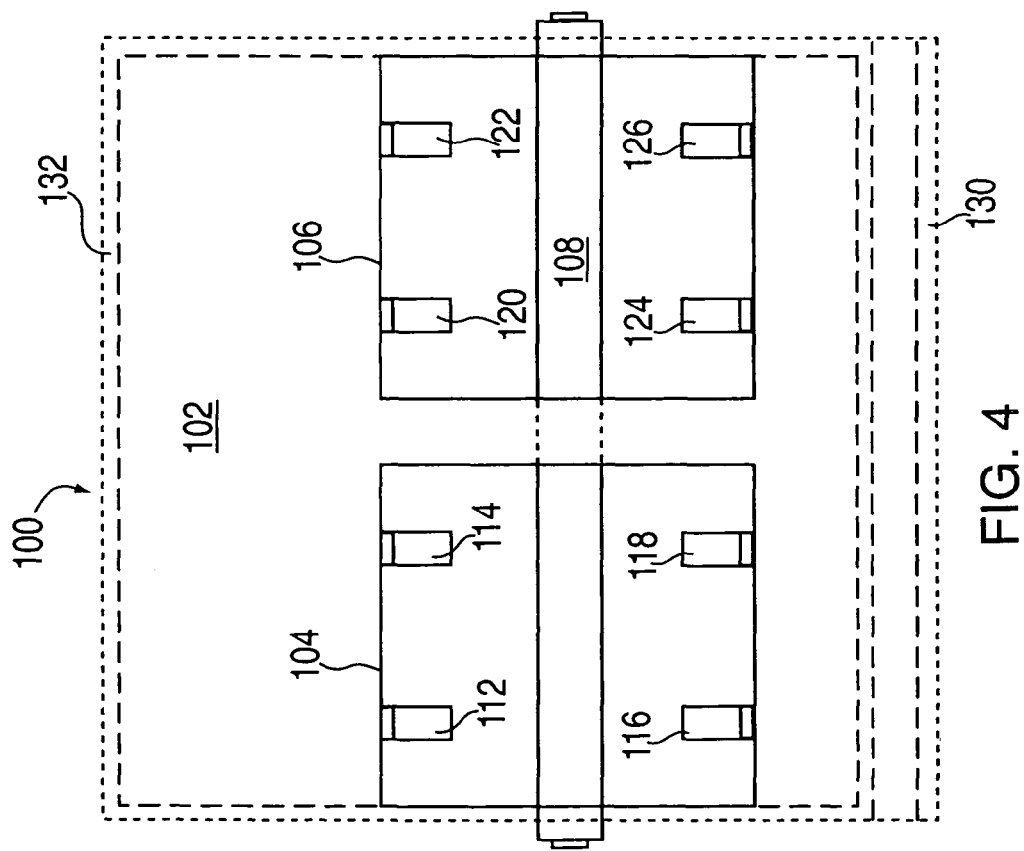

CAR AND TRUCK BEVERAGE HOLDER

BACKGROUND OF THE INVENTION

1. Field of the Invention

The invention relates to a holder for a beverage container. More particularly, the invention relates to a beverage container holder which securely holds beverage containers of different shape and size.

2. State of the Art

Today, the passenger compartment of almost every motor vehicle has at least one cup-like structure which is designed to hold a beverage container. Many beverage containers are similar in size and shape. For example, 12 and 16 ounce cans and 12 and 16 ounce bottles are all circular in cross section and all have similar diameters (approximately 2.5-2.75 inches). Most paper and foam coffee cups also have similar diameters. Thus, most of the motor vehicle "cup holders" consist of a round structure having a diameter (approximately 2.75-2.875 inches) large enough to accept the largest of the most popular bottles, cans, and cups. Some cup holders even include some resilient means for securely holding the smallest of the most popular bottles, cans, and cups. Nevertheless, these cup holders are all designed to hold round containers.

For some time now, many beverages, particularly juices have been sold in containers which have a square or rectangular cross section. These rectangular containers are generally one of two types, a smaller rectangular container having "foot print" of approximately 1.875×2.75 inches and a larger square container having a foot print of approximately 2.75 inches square. These beverage containers do not fit into any of the automobile cup holders. A potential solution to this problem is shown in U.S. Pat. No. Des. 355,336 which shows what appears to be a plastic rectangular holder having a hanging hook. However, the hook looks to be too small to be effective and, more significantly, the rectangular holder is clearly dimensioned to hold only the smaller rectangular juice container. In other words, it cannot hold the larger square container and certainly cannot hold a round container.

U.S. Pat. No. 5,704,579 proposes an extraordinarily complex beverage container holder which is designed to hold containers of different size and shape. As disclosed in the '579 patent, "[a] holder for a beverage container [includes] a container support platform having a central axis, and a series of container contact elements disposed around the central axis for exerting positioning forces on side surfaces of the container. Each container contact element contains a liquid core material that transitions to a near-solid state when subjected to a magnetic field. Magnetic mechanisms are provided in the holder for generating one or more magnetic fields, that have the result of rigidifying the container contact elements to conform to a range of different container sizes and shapes. The magnetic mechanisms can be electromagnets or permanent magnets." Clearly, this solution is far too expensive to replace the simple plastic cup structure found in most vehicles today.

SUMMARY OF THE INVENTION

It is therefore an object of the invention to provide a beverage container holder which is capable of securely holding beverage containers of different size and shape.

It is also an object of the invention to provide a beverage container holder which is capable of securely holding beverage containers having either a circular or rectangular foot print.

It is another object of the invention to provide a beverage container holder which is capable of securely holding popular rectangular and square beverage containers.

It is still another object of the invention to provide a beverage container holder which is capable of securely holding popular cylindrical beverage containers.

In accord with these objects which will be discussed in detail below, a first embodiment of the beverage container holder of the present invention is a unitary plastic structure which includes a lower rectangular container holding portion and an upper hook portion for hanging the holder onto another structure. According to the invention, the holding portion includes a plurality of resilient inwardly extending fingers, each of which assumes a generally V-shaped configuration when viewed in a vertical plane. This configuration of the fingers enables the easy placement and removal of beverage containers while providing a biasing structure which serves to accommodate a variety of containers including square, rectangular, and round containers. According to a presently preferred first embodiment, the holding portion is formed as a frame structure in order to conserve material. The presently preferred dimensions of the holding portion are 2.875×2.875×3.5 inches. The resilient fingers preferably extend approximately 0.5 inches into the holding portion. The upper hook portion is preferably dimensioned to attach to a portion of a vehicle door adjacent to a window. This embodiment of the invention is intended for use with existing vehicles and can also be used to hold beverage containers in other places, e.g. on the arm of a lawn chair.

A second embodiment of the invention is designed to be built into a future vehicle and is designed to replace a retractable container holder such as that disclosed in U.S. Pat. No. 5,297,767. According to this embodiment, the holder includes an upper tray portion having a pair of side-by-side square openings and a generally U-shaped supporting member which is pivotally attached to the tray portion. The supporting member is rotatable from a first position wherein it is retained within the tray portion to a second position wherein it is substantially perpendicular to the tray portion. When the supporting member is in the first position, the holder may be retracted into a rectangular pocket. When the holder is withdrawn from the pocket, the supporting member may be rotated to the second position so that beverage containers placed into the square openings of the tray portion are supported from beneath. The supporting member is preferably spring loaded so that it automatically rotates to the second position when the holder is withdrawn from the pocket. As with the first embodiment, this embodiment includes a plurality of resilient inwardly extending fingers, each of which assumes a generally V-shaped configuration when viewed in a vertical plane. The fingers are arranged inside the square openings and extend approximately one half inch inward. According to a presently preferred second embodiment, the tray portion is approximately 6.5×6.5×0.875 inches and has front and rear flanges which depend downward approximately 1.5 inches. The square openings are each 2.875 inches square and are spaced approximately 0.5 inches apart. The rotating support member depends approximately 3 inches from the tray portion when in the second position.

Additional objects and advantages of the invention will become apparent to those skilled in the art upon reference to the detailed description taken in conjunction with the provided figures.

BRIEF DESCRIPTION OF THE DRAWINGS

FIG. 1 is a front elevation view of a first embodiment of the invention;

FIG. 2 is a side elevation view of the first embodiment of the invention;

FIG. 3 is a top plan view of a slightly modified first embodiment of the invention;

FIG. 4 is a top plan view of a second embodiment of the invention; and

FIG. 5 is a side elevation view of the second embodiment of the invention.

DETAILED DESCRIPTION OF THE PREFERRED EMBODIMENTS

Referring now to FIGS. 1 through 3, a first embodiment of the beverage container holder 10 of the present invention is a unitary plastic structure which includes a lower rectangular container holding portion 12 and an upper hook portion 14 for hanging the holder onto another structure (not shown). According to the invention, the holding portion includes a plurality of resilient inwardly extending fingers 16, 18, 20, 22, each of which assumes a generally V-shaped configuration (seen best in FIG. 1) when viewed in a vertical plane. This configuration of the fingers enables the easy placement and removal of beverage containers while providing a biasing structure which serves to accommodate a variety of containers including square, rectangular, and round containers. As shown, the holder 10 has four resilient fingers. It will be appreciated, however, that a different number of fingers could achieve similar results.

According to a presently preferred first embodiment, the holding portion 12 is formed as a frame structure in order to conserve material. It is presently preferred that the beverage holder 10 be made of a unitary molded plastic piece. It will be appreciated, however, that the beverage holder may be made of metal and may be constructed from two or more pieces which are attached to each other. The presently preferred dimensions of the holding portion are 2.875×2.875×3.5 inches. The resilient fingers 16, 18, 20, 22 preferably extend approximately 0.5 inches into the holding portion. The upper hook portion 14 is preferably dimensioned to attach to a portion of a vehicle door adjacent to a window. This embodiment of the invention is intended for use with existing vehicles and can also be used to hold beverage containers in other places, e.g. on the arm of a lawn chair.

A second embodiment of the invention is designed to be built into a future vehicle and is designed to replace a retractable container holder such as that disclosed in U.S. Pat. No. 5,297,767. According to this embodiment, shown in FIGS. 4 and 5, the holder 100 includes an upper tray portion 102 having a pair of side-by-side square openings 104, 106 and a generally U-shaped supporting member 108 which is pivotally attached to the tray portion 102. The supporting member 108 is rotatable from a first position (shown in phantom in FIG. 5) wherein it is retained within the tray portion to a second position wherein it is substantially perpendicular to the tray portion and directly below the openings 104, 106. When the supporting member 108 is in the first position, the holder 100 may be retracted into a rectangular pocket (not shown). When the holder 100 is withdrawn from the pocket, the supporting member 108 may be rotated to the second position so that beverage containers placed into the square openings 104, 106 of the tray portion are supported from beneath by the supporting member 108. The supporting member 108 is preferably spring loaded, e.g. by spring 110 so that it automatically rotates to the second position when the holder is withdrawn from the pocket. As with the first embodiment, this embodiment includes a plurality of resilient inwardly extending fingers 112, 114, 116, 118, 120, 122, 124, 126, each of which assumes a generally V-shaped configuration when viewed in a vertical plane. The fingers are arranged inside the square openings 104, 106 and extend approximately one half inch inward. According to a presently preferred second embodiment, the tray portion is approximately 6.5×6.5×0.875 inches and has front and rear flanges 130, 132 which depend downward approximately 1.5 inches. The purpose of the flanges is to limit movement of the holder 100 into and out of the pocket (not shown). The square openings 104, 106 are each 2.875 inches square and are spaced approximately 0.5 inches apart. The rotating support member 108 depends approximately 3 inches from the tray portion when in the second position. According to a presently preferred version of this embodiment, the tray 102 is made of molded plastic; the fingers 112, 114, 116, 118, 120, 122, 124, 126 are metal spring clips; and the support member 108 is aluminum.

There have been described and illustrated herein several embodiments of a beverage container holder. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A beverage container holder for round and square beverage containers, comprising:

a rectangular tray having a top wall having a pair of spaced-apart rectangular openings; and at least two sets of four resilient, V-shaped, flat fingers, each having an upper fixed end which is coupled to said top wall of said rectangular tray and a lower free end extending inwardly toward a different one of said rectangular openings, said fingers each defining a point of a V between said ends thereof and having a V-shaped profile when viewed in a vertical plane with the point of the V extending radially inwardly generally towards the center of the respective rectangular opening, said fingers of each set forming a biasing structure for releasably supporting a beverage container when inserted into said rectangular basket and cooperating to resiliently and releasably grasp both round and square beverage containers; and a supporting member rotatably coupled to said rectangular tray and being pivotable into a position located below said pair of rectangular openings.

2. A beverage container holder according to claim 1, further comprising:

spring means for biasing said supporting member to said position located below said rectangular opening.

* * * * *